United States Patent Office 3,553,091
Patented Jan. 5, 1971

3,553,091
METHOD OF PHOTONITROSATION OF CYCLOALKANES
Fumio Nishikawa, 8 Denjiyama, Narumi-cho, Midori-ku; Ryoichi Yasuda, 40 1-chome, Shijo-cho, Minami-ku; and Keiji Nakao, 19 2-chome, Matsuzono-cho, Mizuho-ku, all of Nagoya, Japan
Filed Aug. 14, 1967, Ser. No. 660,340
Claims priority, application Japan, Aug. 17, 1966, 41/53,661
Int. Cl. B01j 1/10
U.S. Cl. 204—162
2 Claims

ABSTRACT OF THE DISCLOSURE

An improvement of a known so-called photonitrosation method for cycloalkanes by which the cycloalkanes are nitrosated under the irradiation of light with a nitrosating agent to form corresponding nitrosation products. This improvement is achieved by using a light from the sodium vapor lamp as a light source which meets the conditions of (a) and (b) specified in the main claim.

---

Figure 1:
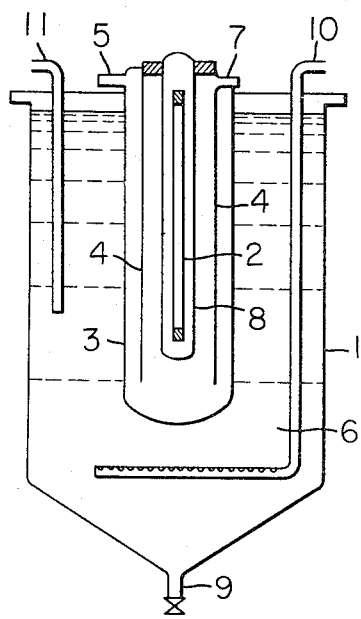

This invention relates to an improvement of a known so-called photonitrosation method for cycloalkanes by which the cycloalkanes are nitrosated under the irradiation of light with a nitrosating agent to form corresponding nitrosation products, and more specifically to a method of carrying out the photonitrosation by irradiating light having an emission energy of a specific range at a wavelength of a specific range.

It is well known that the above-mentioned known method encountered numerous shortcomings which could not be avoided. Namely, concomitantly with the proceeding of the photonitrosation reaction, a viscous, yellow to brown coating of a tar-like substance (may be called "soil" hereafter) would be formed on the light transmitting wall in contact with a reaction liquor and result in a decrease in the rate of transmission of the light. Because of this, the rate of the photonitrosation reaction decreases acceleratingly with the passage of time, and it impossible to maintain a stable reaction for a prolonged time. The formation of this tar-like substance not only obstructs the progress of the reaction and the maintenance of a stable reaction, but also leads to the deterioration of the quality of a final product and result in the wasting of light energy from the light source.

As the increase of the concentration of the nitrosating agent in the photoreaction system results in an extreme increase of the above-mentioned disadvantages, the practice of this known method is restricted in many ways and undergoes commercial disadvantages, and there are still many problems to solve.

With a view to overcoming one or more disadvantages of this photonitrosation reaction, the choice of a light source has hitherto been attempted besides the provision of additional means or operations. If the above-mentioned disadvantages can be overcome by the choice of a light source without the necessity of additional means or operations, the inventive progress will be great. As one of such attempts, another research group of the applicants' company proposed a method of photonitrosating a cycloalkane which comprises reacting the cycloalkane with a nitrosating agent under the irradiation of light from a thallium lamp to form the corresponding cycloalkanone-oxime, and maintaining the concentration of nitrosating agent at the equivalent of 0.15 to 0.8% nitrosyl chloride based on the weight of the reaction system (British Pat. No. 1,066,114 published on April 19, 1967).

This proposal gives far more excellent results than the method of using the light from such a light source as a mercury lamp, high pressure mercury lamp and fluorescent mercury lamp which has hitherto been utilised in the photonitrosation reaction. It is noteworthy in that the method is operable even with the concentration of a nitrosating agent at more than 0.25% by weight which had not been feasible before at this concentration. The inventors studied the relation between the photonitrosation reaction of cycloalkanes and the distribution of the wavelength of light and its emission energy, and found a method by which it is possible to carry out a photonitrosation reaction that has been improved remarkably over the conventional method of using a thallium lamp. The inventors have also found that this improvement can be achieved by the use of a sodium vapor lamp of the type wherein the amount of emission energy of light of a specific wavelength is within a specific range, and besides the prevention of formation of a tar-like substance, the maintenance of a stable reaction for a prolonged time, the increase in the yield of oxime per unit power and the operability of the method even at high concentrations of a nitrosating agent, they can achieve a remarkable improvement of the quality of the resulting nitrosation product, avoid the necessity of carrying out the reaction in a plurality of reaction zones of small capacity incident to the restrictions on the thickness of a reaction liquor layer, and effect the operation in a reaction zone of large capacity.

Accordingly, an object of this invention is to provide a method of manufacturing a nitroso compound by nitrosating a cycloalkane with a nitrosating agent under the irradiation of light, by which a photonitrosation reaction that is more improved over the conventional method can be effected.

Other objects and advantages of this invention will become more apparent from the following statement.

The objects of this invention can be achieved by carrying out the known photonitrosating reaction including alternative embodiments known in the art under the irradiation of light from a sodium vapor lamp as a light source which meets the following specific conditions. The conditions required of the light source are a sodium vapor lamp in which:

(a) not less than 50%, preferably not less than 70%, of a total amount of emission energy of a light having a wavelength of 3800 to 7800 A. belonging to a visible range is occupied by a light having a wavelength in the range of 4500 to 6500 A., and (b) 5 to 80%, preferably 5 to 60%, of the amount of emission energy of the light having a wavelength in the range of 4500 to 6500 A. is occupied by a light having a wavelength in the range of 4500 to 5500 A.

Neither the mercury lamps hitherto utilised industrially nor the thallium lamp used in the above-mentioned proposal satisfies the above conditions, and is excluded from the scope of this invention.

It should be noted that ordinarily available low pressure sodium vapor lamps neither satisfy the above conditions and can achieve the objects of this invention, and therefore that they are excluded from the scope of this invention. In this connection, it is known that a sodium vapor lamp, although not used industrially in the past, may be used similarly to the mercury lamp (see British Pat. 1,041,056). Unexpectedly, however, it has been found that the sodium vapor lamp does not exhibit an operation equivalent to the mercury lamp but brings about excellent results in the photonitrosation reaction of cycloalkanes, and that such excellent results cannot be achieved at all by the sodium vapor lamp which does not satisfy the above conditions (a) and (b).

These are quite unexpected results in view of the fact that although both a sodium vapor lamp outside the above-mentioned conditions and a sodium lamp meeting the above conditions discharge a sodium D-ray (with a wavelength of 5890/96 A.), the above-mentioned improvements can be achieved only when such sodium lamp satisfies the aforesaid conditions (a) and (b) of the invention.

There is no particular theoretical restriction on the source of light, but it is necessary to fulfil the afore-said conditions (a) and (b). Industrially, a high pressure sodium vapor lamp satisfying these conditions can preferably be used. There is used a lamp wherein sodium or sodium compound, ordinarily sodium halide, preferably sodium iodide and sodium bromide is enclosed as a discharge tube medium. With a view to facilitating the ignition of discharge and maintain the electrical character, optical character and performance, this lamp may contain an element of Group O of the Periodic Table such as argon, neon and xenon or an element other than sodium of Groups I to III of the Periodic Table such as Li, K, Rb, Cs, Ag, Au, Ba, Mg, Ca, Sr, Zn, Cd, Ga, Th, Eu, Hg and Tl in the form of a simple substance, its compound, usually its halide, or a suitable mixture of these. Particularly, a preferable high pressure sodium vapor lamp to be used in this invention contains an element of Group O of the Periodic Table and mercury.

There is no particular restriction on the amount of sodium to be enclosed, the structure of the lamp, or the material for constructing a transmission portion of a lamp and other parts, and modifications may be made within the knowledge of the art of manufacturing a discharge tube.

It is also possible to effect irradiation by cutting off the light of unnecessary wavelengths using a suitable filter so that the said conditions (a) and (b) may be satisfied.

Cycloalkane, for instance cyclohexane, cyclooctane, cyclododecane, are particularly of commerical importance as a raw material of polyamide, it being not restricted by the number of its carbon atoms. A solution of cycloalkane in other inert solvent or a mixture of more than two cycloalkanes may be used. Examples of the nitrosating agent are such known agents as nitrosyl chloride, a gaseous mixture of nitrosyl chloride and hydrogen chloride, a gaseous mixture of nitrogen monoxide, chlorine and hydrogen chloride, a gaseous mixture of nitrose gas and chlorine, and a gaseous mixture of nitrose gas, chlorine and hydrogen chloride.

Any of these nitrosating agents acts as nitrosyl chloride in the photoreaction system and this invention is not limited whatsoever by the form of such nitrosating agent to be fed.

In accordance with the method of this invention, the reaction can be carried out with excellent results not only at the previously employed concentrations but also concentrations above 0.8% which have hitherto been disadvantageous. Usually, concentrations above 0.1% by weight, preferably 0.1 to 1.5% by weight, more preferably 0.2 to 0.6% by weight, may be used.

The reaction may be carried out either by a batchwise process or by a continuous process, but of course the continuous process is commercially advantageous. The utilizable size and shape of the reaction tank and the light source are those hitherto known. The cooling of the light source may be carried out in the same manner as hitherto known.

The reaction temperature employed is in the known range, usually —20° to 50° C., the temperature in the range of 10° to 20° C. being especially preferred.

The photoreaction of cycloalkane is carried out by using a mercury lamp with the concentration of nitrosyl chloride in the reaction system adjusted to the range of 0.1 to 0.2% by weight or an equivalent quantity of other nitrosating agent, which is suitable for obtaining a good yield of oxime by the use of any mercury lamp, and the method of the previous proposal is practised under the same conditions but with the concentration of nitrosyl chloride adjusted to 0.25 to 0.5% by weight which is similarly suitable when a thallium lamp is used as a light source.

Further, the method of this invention is practised under the same conditions but with the concentration of nitrosyl chloride adjusted to 0.1 to 0.5% by weight which is similarly suitable when a sodium vapor lamp which satisfies the said conditions (a) and (b) is used as a light source. The amount of oxime formed per unit power is increased 50 to 100% for the thallium lamp as compared with the use of a mercury lamp. But when the sodium vapor lamp is used in accordance with the method of this invention, it increases 30 to 50% as compared with the use of a thallium lamp.

If the thickness of a reaction liquor is adjusted to the optimum for the respective light when the said thallium lamp is used and also when a sodium vapor lamp satisfying the above conditions (a) and (b) is used, there is an increase of 50 to 70% in the yield of oxime per unit power, and it is possible to reduce the number of reaction vessels necessary for producing a certain amount of oxime to below 2/3.

It is generally known that the higher the concentration of nitrosyl chloride in the photoreaction system is, the greater the rate of the formation of "soils" becomes. Experiments in which cyclohexane is used as cycloalkane show that the time during which photoreaction could be continued stably when the concentration of nitrosyl chloride in the photoreaction zone is 0.5% by weight is 13 to 18 hours for mercury lamps while it reaches 40 hours in the previous proposal in which a thallium lamp is used. When the above experiment is repeated under the same conditions except that a high pressure sodium vapor lamp satisfying the above conditions (a) and (b) is used as a light source in accordance with this invention, the time during which photoreaction can be continued stably reaches 200 hours. This is surprising.

By the "time during which photoreaction can be continued stably" used here is meant a time from the initiation of the reaction to a point where the yield of oxime per unit power is lowered to 80% of that at the early stage of the reaction, and it is hereafter to be referred to as a "stable time."

With the increase of the concentration of nitrosyl chloride in the reaction system the rate of the formation of soils becomes more rapid and the stable time is prone to decrease. This is the same with the sodium vapor lamp.

Our research has revealed that so long as a sodium vapor lamp which satisfies the conditions (a) and (b) is used, even when the concentration of nitrosyl chloride in the photoreaction system is 0.8% by weight, the stable time reaches 25 hours, which is a great improvement on that attained with the use of mercury lamps.

It should be further noted that when a sodium vapor lamp that does not satisfy the conditions (a) and (b) is used, the above-mentioned improvements cannot be achieved by the method of this invention.

Generally, in the photonitrosation reaction of cycloalkane, there is a tendency that a longer stable time brings about a better quality of the resulting oxime with a small amount of impurities. Such phenomenon is the same when a sodium vapor lamp satisfying the conditions (a) and (b) is used. When, therefore, such sodium vapor lamp is used, even if the concentration of nitrosyl is relatively high, the resulting oxime has a good quality. The relationship between the concentration of nitrosyl chloride in the reaction system and the quality of lactam obtained from the oxime by the Backmann rearrangement after preparation of cyclohexanone oxime from cyclohexane by photonitrosation reaction is shown in Table 1 in respect of a thallium lamp, a sodium vapor lamp A that satisfies the conditions (a) and (b) of this invention, and a sodium vapor lamp C that does not satisfy the above conditions.

TABLE 1

| Concentration of nitrosyl chloride (percent by weight) | PMV of distilled lactam (second) | | |
|---|---|---|---|
| | Thallium lamp (control) | Sodium vapor lamp A | Sodium vapor lamp C (control) |
| 0.1 | 125 | 140 | 130 |
| 0.3 | 120 | 160 | 140 |
| 0.5 | 110 | 150 | 125 |
| 0.8 | 95 | 130 | 110 |
| 1.0 | 50 | 120 | 70 |
| 1.3 | 10 | 110 | 60 |
| 1.5 | (²) | 105 | 50 |

² Less than 10.

Figure 2:
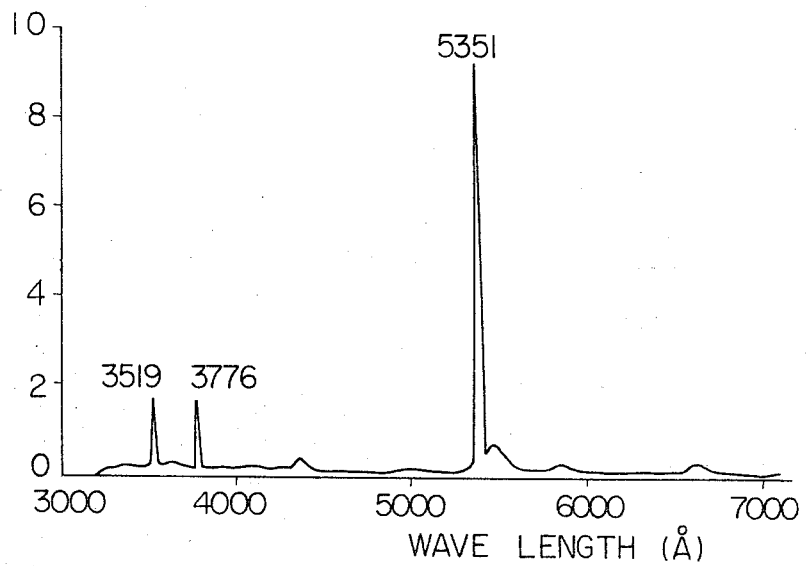
Figure 3:
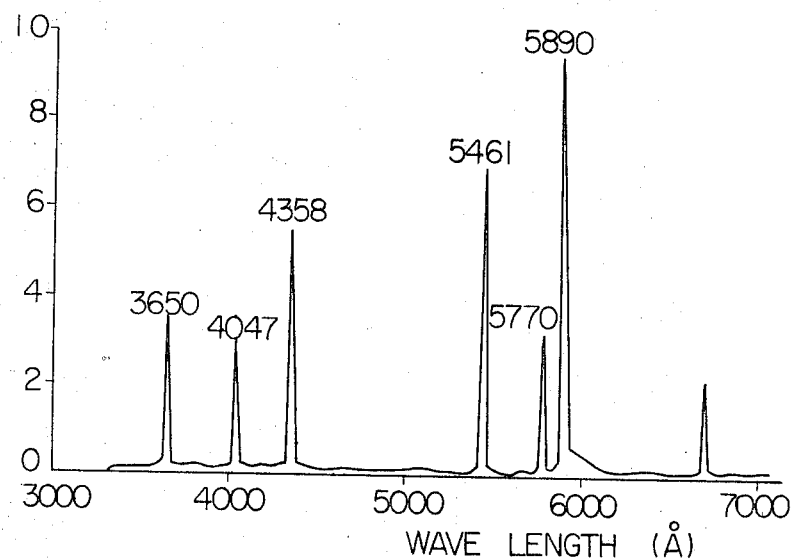
Figure 4:
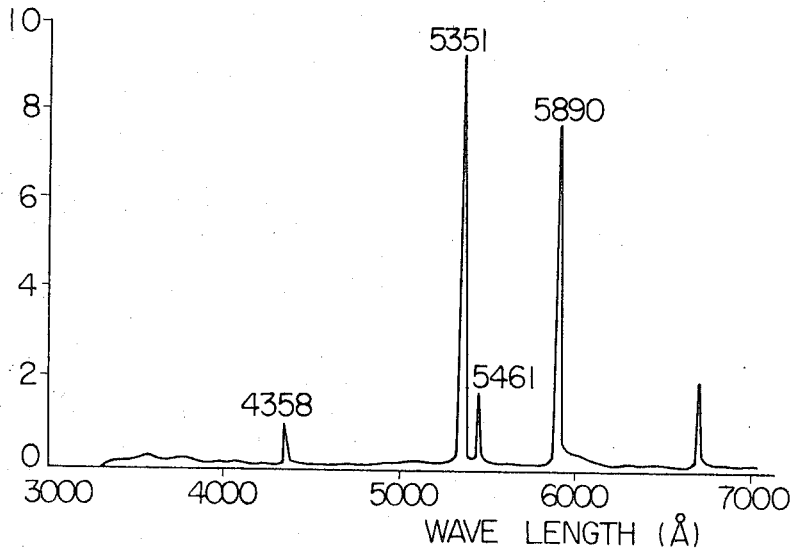
Figure 5:
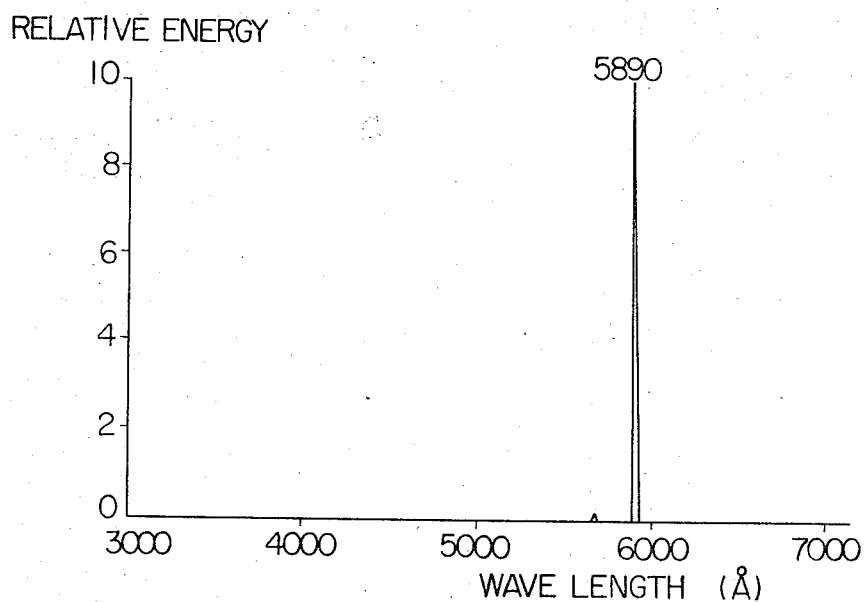

NOTE.—As for the relationship between the relative energy and the wave length in respect of the thallium lamp, sodium vapor lamp A and sodium vapor lamp B, reference may be made to Table 9, and Figs. 2 to 4.

The valuation of the quality of oxime is made as follows. Oxime is subjected to Beckmann's rearrangement by means of sulphuric acid to give ε-caprolactam (abbreviated as lactam). The sulphuric acid mingled with said lactam is neutralized with an aqueous ammonium solution and removed. The water in the crude lactam is removed by simple distillation. The obtained anhydrous crude lactam is distilled under reduced pressure on addition of a small amount of caustic soda to form distilled lactam. The measure of reducible impurities in this distilled lactam is known by the time (PMV) in which potassium permanganate added to said lactam is consumed. Therefore, the greater the value of PMV, the better the quality of the lactam. From the above given Table 1, it is known that the quality of the oxime obtained in accordance with the method of this invention is improved as compared with the prior art processes.

There are many hitherto proposed improvements such as a method for washing a deposited tarry substance off with sulphuric acid, a method for removing ultraviolet rays irradiated from a light source, a method for making great excess of hydrogen chloride present in nitrosation. These improved methods may be used jointly with this invention.

As so far mentioned, in accordance with the method of this invention, there is no restriction on the thickness of a liquid layer, and photonitrosation reaction can be carried out advantageously in a reaction zone of larger capacity as compared with the conventional method. Thus, it becomes unnecessary to provide a plurality of reaction zones of small capacity, and the expense for the provision and maintenance of reaction vessels have been remarkably curtailed. Naturally, it has become unnecessary to operate many reaction vessels, and the method of this invention is exceedingly advantageous from the point of operation, too. In addition, it is possible to tremendously increase the yield of oxime per unit power consumed in the reaction, to inhibit the formation of an opaque brown tarry substance deposited on the surface of a transparent partition, for instance a sheet of glass, provided between the light source and the reaction system, and to carry out a stable photoreaction for a prolonged time to give a high quality oxime.

Several embodiments of the method of this invention will be illustrated below by examples.

EXAMPLE 1

In a metallic titanium-made photoreaction tank 1 of the type as shown in FIG. 1 of the accompanying drawing was placed 270 litres of cyclohexane, and a rod-like 10 kw. discharge tube 2 equipped with a protecting tube 8 made of Pyrex glass ("Pyrex" is a Registered Trademark), was perpendicularly inserted as a light source into the centre of the tank 1. The reaction tank was cooled externally (not shown) and the reaction liquor 1 was maintained at 10° C. From a gas-blowing tube 10, a gaseous mixture of nitrosyl chloride and hydrogen chloride (nitrosyl chloride being 10% by volume) was fed as a nitrosating agent into the reaction liquor at the rate of 450 litres per minute. Under this condition, it was possible to maintain the concentration of nitrosyl chloride in the reaction system at 0.5% by weight.

The numeral 3 shows a jacket of the light source, numeral 4 shows a plate regulating the path which cooling water flows and numeral 9 shows an opening from which the reaction product is taken out. In order to cool the light source, a cooling water is poured from an inlet 5 and taken out from 7. At this time it is possible to utilise a known means of forming a solution filter for the cutting off of the lights of wavelengths detrimental to the reaction, by adding a suitable additive to the cooling water.

Cyclohexane consumed in the reaction is fed continuously from a cyclohexane feeding tube 11 at a rate of 10 litres per hour. With the passage of reaction time, the yield of cyclohexanone oxime decreased. When it decreased to 80% of that at the initial stage of reaction, the reaction was stopped.

The same procedure was repeated except the use as the said discharge lamp of two sodium vapor lamps A and B within the conditions (a) and (b), a sodium vapor lamp C outside the conditions (a) and (b), and a thallium lamp respectively (see Table 9, FIGS. 3, 4, 5 and 2). The results are shown in Table 2.

TABLE 2

| Lamp | Stable time (hour) | Yield of oxime per one hour of the stable time (kg./hr.) |
|---|---|---|
| Thallium lamp (control) | 40 | 2.9 |
| Sodium vapor lamp A | 150 | 3.8 |
| Sodium vapor lamp B | 95 | 3.3 |
| Sodium vapor lamp C (control) | 60 | 3.0 |

It is clear from Table 2 above that according to the method of this invention, an exceedingly long stable time and high yield can be attained as compared with the use of the sodium vapor lamp C and thallium lamp which lie outside the conditons (a) and (b) of this invention.

EXAMPLE 2

Example 1 was repeated except that the thickness of the reaction liquor was increased and a reaction vessel of large capacity with 500 litres of cyclohexane placed therein was used. The results are shown in Table 3 below.

TABLE 3

| Lamp | Stable time (hour) | Yield of oxime per one hour of the stable time (kg./hr.) |
|---|---|---|
| Thallium lamp (control) | 40 | 2.9 |
| Sodium vapor lamp A | 160 | 4.4 |
| Sodium vapor lamp B | 100 | 3.4 |

It is clear from Table 3 that according to this invention, the reaction is very advantageously carried out even in a reaction zone of large capacity, that there is no restriction in the thickness of a reaction liquor, and that the degree of utilisation of the reaction liquor is increased.

EXAMPLE 3

Example 1 was repeated except that cyclooctane was used as the cycloalkane. The results are shown in Table 4.

TABLE 4

| Lamp | Stable time (hour) | Yield of oxime per one hour of the stable time (kg./hr.) |
|---|---|---|
| Thallium lamp (control) | 31 | 3.8 |
| Sodium vapor lamp A | 85 | 4.7 |
| Sodium vapor lamp B | 62 | 4.1 |

EXAMPLE 4

Example 1 was repeated except that as the cycloalkane, a mixture of cyclododecane and cyclohexane in a weight proportion of 2 to 1 was used. The results are shown in Table 5.

TABLE 5

| Lamp | Stable time (hour) | Yield of oxime per one hour of the stable time (kg./hr.) | |
|---|---|---|---|
| | | Cyclo-dodecanone oxime | Cyclo-hexanone oxime |
| Thallium lamp (control) | 15 | 3.7 | 0.9 |
| Sodium vapor lamp A | 35 | 4.9 | 1.4 |
| Sodium vapor lamp B | 28 | 4.2 | 1.1 |

EXAMPLE 5

The reaction was carried out in the same manner as in Example 1 with the concentration of nitrosyl chloride in the reaction system varied as indicated in Table 6 below. The results are shown below in Table 6.

TABLE 6

| Concentration of nitrosyl chloride in reaction system (percent by weight) | Yield of oxime per one hour of the stable time (kg./hr.) | | |
|---|---|---|---|
| | Thallium lamp (control) | Sodium vapor lamp A | Sodium vapor lamp B |
| 0.3 | 2.9 | 3.5 | 3.1 |
| 0.5 | 2.9 | 3.8 | 3.3 |
| 0.8 | 2.7 | 3.8 | 3.3 |
| 1.0 | 2.3 | 3.6 | 3.0 |
| 1.5 | 1.7 | 3.1 | 2.6 |

EXAMPLE 6

Figure 6:
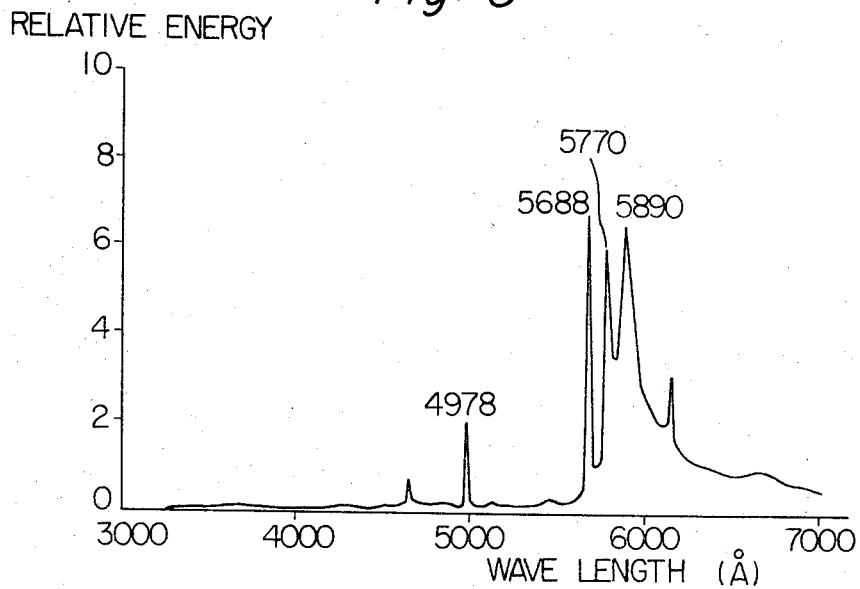

Example 1 was repeated except the use as the light source of a high pressure sodium lamp D (see Table 9 and FIG. 6) satisfying the above-mentioned conditions (a) and (b) which had been made by using a light transmissible alumina as a luminous tube, and in which the vapor pressure of sodium at the time of lightening was about 200 mm. Hg. The results are shown in Table 7.

TABLE 7

| Light source | Yield of oxime per unit time, kg./hr. | Stable time, hours |
|---|---|---|
| High pressure sodium vapor lamp D | 4.6 | 200 |

EXAMPLE 7

Table 9 below shows the results of comparison of sodium lamp A, sodium lamp B and high pressure sodium lamp C, and the conventionally used thallium lamp C with respect to luminiscence ratio.

With the use of these lamps, 40 litres of cyclohexane was put into a photoreaction vessel made of metallic titanium and having a diameter of 30 cm. and a depth of 80 cm. (shown in FIG. 1). The photo-reaction was carried out in the same manner as in Example 1. The results are shown in Table 8.

TABLE 8

| Lamp Type | Results of reaction | | |
|---|---|---|---|
| | Power (kw.) | Stable time (hr.) | Yield of oxime at peak (g./k.w.-h.) | Purity of oxime in the resulting oily product (percent) |
| High pressure mercury lamp | 0.4 | 10 | 200 | 55 |
| Thallium lamp | 0.4 | 30 | 290 | 57 |
| Sodium lamp C | 0.2 | 50 | 310 | 59 |
| High pressure sodium lamp D | 0.4 | 85 | 410 | 50 |
| Sodium lamp A | 0.4 | 70 | 350 | 58 |
| Sodium lamp B | 0.4 | 70 | 370 | 58 |

TABLE 9

| Lamp | Elements enclosed in the lamp | Figure | Ratio of light having a wavelength of— | |
|---|---|---|---|---|
| | | | 4,500-6,500 A. in a total amount of emission energy of light having a wavelength in the range of 3,800-7,800 A. (percent) | 4,500-5,500 A. in amount of emission energy of light having a wavelength in the range of 4,500-6,500 A. (percent) |
| Sodium vapor lamp: | | | | |
| A | Hg-NaI-Ar | 3 | 79 | 13 |
| B | Hg-TlI-NaI-Ar | 4 | 83 | 43 |
| D (high pressure) | Hg-Na-Xe | 6 | 92 | 9 |
| C | Ng-Na-Ar | 5 | 100 | 0 |
| Thallium lamp | Hg-TlI-Ar | 2 | 61 | 95 |
| Sodium vapor lamp: | | | | |
| E | Hg-TlBr-NaI-NaBr-Ar | | 79 | 60 |
| F | Hg-TlI-TlBr-NaI-NaBr-Ar | | 55 | 66 |
| G | Hg-TlI-NaI-IrI$_3$-Ar | | 81 | 29 |

We claim:
1. A method of photonitrosating cycloalkanes which comprises nitrosating a cycloalkane with nitrosyl chloride in an amount of 0.1 to 1.5% based on the weight of the reaction system under the irradiation of light to form a corresponding nitrosation product, characterized in that the nitrosation reaction is carried out under the irradiation of light from a sodium vapor lamp as light source, the said sodium lamp satisfying the following conditions (a) and (b):
  (a) not less than 50% of a total amount of emission energy of a light having a wavelength of 3800 to 7800 A. belonging to a visible range is occupied by a light having a wavelength in the range of 4500 to 6500 A., and,
  (b) 5 to 80% of an amount of emission energy of the light having a wavelength in the range of 4500 to 6500 A. is occupied by a light having a wavelength in the range of 4500 to 5500 A.
2. The method according to claim 1 wherein the said sodium vapor lamp contains at least one of mercury and an element of Group O of the Periodic Table, in addition to sodium or sodium halide.

References Cited
UNITED STATES PATENTS 3,309,298 3/1967 Ito et al. _____ 204—162OX
3,320,143            Baumgartner et al. _ 204—162OX

FOREIGN PATENTS 1,066,114 4/1967 Great Britain ____ 204—162OX

BENJAMIN R. PADGETT, Primary Examiner